UNITED STATES PATENT OFFICE.

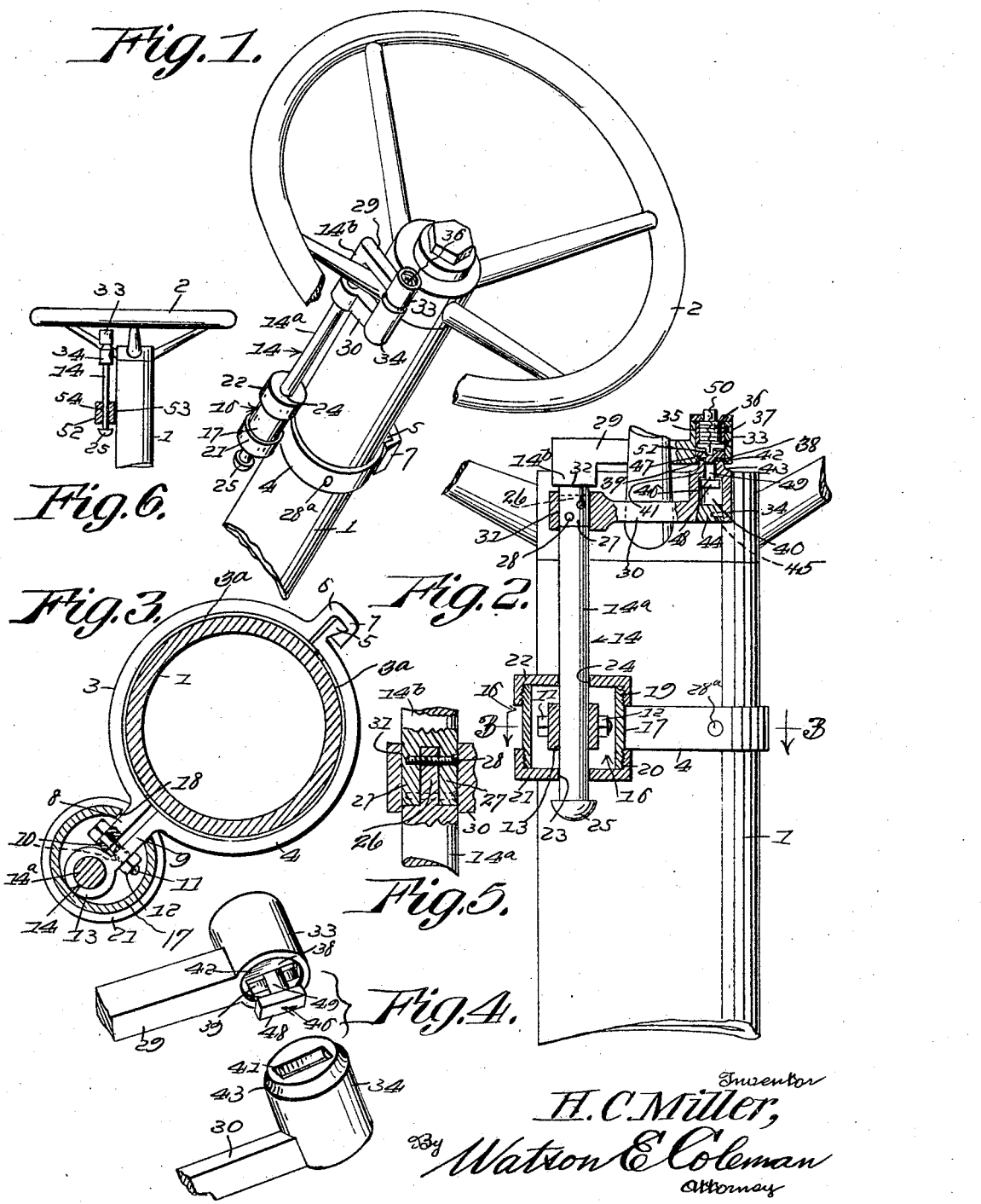

HIRAM C. MILLER, OF PARKESBURG, PENNSYLVANIA.

LOCKING DEVICE FOR STEERING WHEELS.

1,421,020.  Specification of Letters Patent.  Patented June 27, 1922.

Application filed November 8, 1920. Serial No. 422,595.

*To all whom it may concern:*

Be it known that I, HIRAM C. MILLER, a citizen of the United States, residing at Parkesburg, in the county of Chester and State of Pennsylvania, have invented certain new and useful Improvements in Locking Devices for Steering Wheels, of which the following is a specification, reference being had to the accompanying drawings.

It is a purpose of the present invention to provide a locking device of the present character to prevent the manipulation of a steering wheel of an automobile, and primarily to improve and render it more secure and efficient than the locking device disclosed in the Patent No. 1,346,837, issued to Hiram C. Miller on July 20, 1920.

In the patent above mentioned it has been found possible to distort the hooked end of the locking element, so as to detach it from the spoke of the steering wheel, thereby allowing the wheel to be manipulated.

Therefore, it is a further purpose to not only provide means for fastening the hooked end of the locking element more securely to the steering wheel, so as to prevent disconnection from the spoke, but also to eliminate the padlock employed at the lower end of the locking element, thereby practically rendering it impossible to unlock the steering wheel so that it can be operated.

The invention also aims to conceal the various rivets or like securing means, by finishing them off flushed with surrounding surfaces, and rendering them unnoticeable, so that they cannot be tampered with, in order to loosen the parts.

As a still further purpose, it is the aim to provide the lock mechanism, such as a tumbler cylinder lock, or any other suitable cylinder locking device, for locking a two-part device to the spoke of the steering wheel, and also to render the securing means for this cylinder lock unnoticeable.

Additionally the invention aims to provide a two-part locking device, one part being carried by the other and engaging under one of the spokes of the steering wheel, and the other part over the spoke, with means for connecting the two parts, together with the cylinder lock for locking said means. The parts which engages over the spoke having an extension, which engages through the cylinder or shell or housing, the construction of which is herein described, but is described and claimed in the aforesaid patent.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of an automobile steering wheel showing the improved locking device as applied thereto.

Figure 2 is a vertical sectional view through the same and also through the two part connection which engages the spoke of the steering wheel.

Figure 3 is a sectional view on line 3—3 of Figure 2.

Figure 4 discloses collective views of the adjacent head of the jaws 29 and 30 which are arranged above and below the spoke of the steering wheel, showing the rectangular slots of the adjacent ends of said heads.

Figure 5 is a detail view of the connection between the two sections $14^a$ and $14^b$ of the locking element 14.

Figure 6 is a detail view in elevation of a modified form of connecting the locking element 14 to a steering column.

Referring more especially to the drawings, 1 designates a steering column, showing the same equipped with the usual steering wheel 2. A pair of clamping members 3 and 4 are arranged to engage the steering wheel column, therefore the clamps are semi-circular in construction. The clamp 4 has an angular end 5 which extends laterally relatively to the steering column. The clamp 3 at one end is provided with an angular hook 6 overlying the angular end 5, and is provided with an angular portion 7 extending correspondingly to and engaging the angular end 5 of the clamp 4, thereby connecting the clamps. The other ends of both clamps terminate in parallel parts 8 and 9, which are provided with axially alined openings 10 for the reception of the bolt 11. This bolt 11 is provided with a nut 12, whereby the two parallel parts 8 and 9 can be drawn toward each other to tighten the clamps 3 and 4 on the column. The tighter the parallel parts 8 and 9 are drawn, the tighter the connections between the angular ends 5 and 7, thereby causing the clamps to firmly engage the column. The parallel part 9 terminates in an eye 13, through which the locking element 14 passes.

In order to protect and house the eye 13 and to prevent tampering with the bolt 11, a housing 16 is provided. This housing comprises a cylindrical shell 17 having a longitudinal slot 18. The shell 17 is open at both ends, and is also exteriorly threaded as shown at 19 and 20. In order to apply the housing, the shell 17 is first fitted over the parallel parts 8 and 9, so that the slot 18 will receive the parts 8 and 9, at the point where they merge from the clamps 3 and 4. Suitable caps 21 and 22 interiorly threaded as shown engage the threads 19 and 20, thereby closing the opposite ends of the shell. These caps 21 and 22 have eccentrically placed openings 23 and 24. The locking element 14 comprises two sections $14^a$ and $14^b$, and before the locking element is applied, the caps 21 and 22 are applied to the shell, and are adjusted tight enough on the shell until the openings 23 and 24 are axially alined with each other and with the eye 13. After so arranging the caps with their openings in registration with the eye, the section $14^a$ of the locking element is inserted through the housing and through the eye, after which the two sections of the locking element are united. In order to prevent upward movement of the section $14^a$ of the locking element, the lower end of the section $14^a$ has an enlargement or knob 25, which is just below the under surface of the lower cap 21. This knob or enlargement 25 is located directly under the cap 21 of the housing in order to prevent upward movement of the section $14^a$ of the locking element.

In order to connect the two sections $14^a$ and $14^b$ of the locking element, the upper end of the section $14^a$ has a reduced extension 26, which engages between the forks 27 of the lower end of the section $14^b$, there being screws or rivets or other suitable means 28 engaging through the forks and through the reduced extension for securely connecting the two sections. The upper end of the section $14^b$ of the locking element terminates in a lateral arm 29 constituting a jaw, with which the jaw 30 cooperates for holding the steering wheel against movement. This jaw 30 engages under one of the spokes of the steering wheel, while the jaw 29 engages over the spoke. The jaw 30 has an opening 31 at one end corresponding in shape with and engaging the locking element. In other words the jaw 30 is slidable on the two sections of the locking element, the opening 31 closing and fitting the element, so that when the jaw 30 is in raised position on the element and positioned directly under the spoke of the wheel, the wall of the openings 31 overlies the joint between the two sections of the locking element. It will be noted that the heads of the screws or rivets or other means 28 are countersunk in one of the forks of the section $14^b$ of the locking element, and the outer faces of the heads are flushed with the surface of the locking element, so that the wall of the opening in the jaw 30 may easily slide over the joint, and when the jaw 30 is in such a position, it is practically impossible for the joint to be fraudulently tampered with for the purpose of disconnecting the two sections of the locking element. The section $14^b$ of the locking element has a shoulder 32 to limit the jaw 30 in its upper movement on the locking element.

The jaws 29 and 30 at their corresponding ends are provided with cylindrical heads 33 and 34, which, when the jaws 29 and 30 engage above and below the spoke of the steering wheel, are axially alined. The cylindrical head 33 of the jaw 29 is drilled out, thereby providing the head with a cylindrical chamber 35, which receives a conventional form of tumbler lock 36. The barrel of the cylinder lock is secured in the chamber 35 by means of pins 37, which are inserted through the wall of the head 33. These pins are thoroughly countersunk in the head, and their outer ends are flushed with the exterior cylindrical surface of the head and finished off to render them unnoticeable, hence preventing the cylinder lock from being removed from the head. This cylinder lock is inserted in the chamber 25 sufficiently to leave a substantial space between the lower end of the barrel of the cylinder lock and the end wall 38 of the head. The end wall 38 of the head is provided with a transversely disposed slot 39.

The head 34 of the jaw 30 is drilled out to provide a cylinder chamber 40. This cylinder chamber has its upper end wall provided with a transverse slot 41, which is designed to register with the slot 39, when the two cylinder heads of the arms 29 and 30 are brought together. The lower end of the head 33 has an annular depression 42, which has a tapered wall, and is adapted to receive the upper tapered end 43 of the head 34. By this construction it is practically impossible to insert a cold chisel or any other tool between the cylinder heads 33 and 34, for the purpose of separating them. The lower end of the chamber 40 is closed by a slightly tapered plug 44, which is shrunk or otherwise pressed to fit into the chamber, thereby preventing access to the interior thereof. The lower end of the plug is finished off flushed with the under surface of the jaw 30, as in such wise as to render the joint between the plug and the wall of the chamber unnoticeable, so as to avoid any one tampering with the plug for the purpose of removing the same to have access to the locking connections between the two heads. A suitable pin 45 is driven through the wall of the head 34 and into the plug, so as to insure holding the same in place. The outer end of the pin is also rendered flushed and unnoticeable with the outer cylindrical surface of the head.

A suitable locking button 46 is provided, and which has a disk 47 at one end and a lateral rectangular head 48 at the other end, there being a shank 49, connecting the disk and the head. The disk 47 rotatably engages in the space between the barrel of the cylinder lock and the end wall 38 of the head 33, while the shank engages through the slot 39, as the shank 49 is cylindrical. The button is arranged in connection with the head 33 before the cylinder lock is secured in the chamber 35. In other words before inserting the cylinder lock the rectangular head 48 of the disk is passed through the slot 39, until the disk 47 rotatably rests upon the wall 38 of the head 33. After so arranging the disk the cylinder lock 36 is arranged in the chamber 35. The space between the cylinder lock and the end wall 38 of the chamber 35 is large enough, to permit the disk to properly rotate. The cylinder lock, which is of the tumbler type, though it may be of any other conventional construction, includes a rotating shaft or pin 50, which is actuated rotatably by a key (not shown) and adapted to be inserted in the cylinder lock. This pin or shaft of the cylinder lock is flattened as shown, therefore rectangular in cross section, and engages the rectangular slot or depression 51 in the disk 47, so that when the pin or shaft is rotated by the key (not shown), the button will rotate therewith.

When the entire locking device is applied to the column and steering wheel, the locking element is connected to the housing on the column in a manner as previously set forth, with the jaw 29 disposed over one of the spokes of the steering wheel. The jaw 30 is then raised to a position, so that the tapered upper end of the cylindrical head 34 will engage the tapered depression 42 of the lower end of the head 33. When the two heads are brought together, the rectangular slots 39 and 41 register, and the rectangular head 48 of the disk passes through the slot 41 of the head 34. The key (not shown) is then inserted in the cylinder lock, and the pin or shaft of the lock is rotated, thereby rotating the disk, so that the rectangular head 48 of the button will extend at right-angles to the slot 41 of the head 34, thereby securely connecting the two heads 33 and 34 of the jaws 29 and 30. It will be noted that the head 34 extends upwardly beyond the plane of the body of the jaw 30, so that the head 34 will engage one side of the spoke of the steering wheel, hence rendering it necessary to lower the jaw 30, when the two jaws are unlocked, in order to release the steering wheel. The jaw 30 is lowered until it may rest upon the cap 22 of the housing 16. The locking element may then be rotated slightly to remove the jaw 29 from over the spoke of the steering wheel, thereby permitting the locking element to be likewise lowered, as a result of this the steering wheel is free to be operated by the chauffeur.

In order to prevent movement of the clamps 3 and 4, consequently prevent movement of the locking element, the clamp 4 is riveted at 28ª to the wall of the steering column, thereby preventing any unauthorized person from using a hammer to knock the clamps upward toward the steering wheel, so as to prevent movement of the housing 16 relatively to the sectional locking element. Even though it may be possible to dislodge the clamps 3 and 4 relatively to the steering column, it would be impossible to unlock the wheel, as the jaws 29 and 30 are prevented from movement in a plane with the steering column, hence though the housing 16 may be tampered with and made to move on the column, it would be practically impossible to free the steering wheel, as the jaws 29 and 30 are not capable of movement sufficiently to release the steering wheel. As shown in Figure 3, fillers 3ª substantially semi-circular, may be employed between the clamping parts of the steering column, whereby the clamping members may be adapted to fit columns of different diameters.

In Figure 6 it will be noted that the housing 16 is entirely eliminated, and in view thereof a lug 52 is fixedly carried by the steering column. This lug is connected to the column in any suitable manner inaccessibly, preferably by riveting or brazing, preferably the latter, as indicated at 53, and is provided with an opening 54, which rotatably receives the sectional locking element 14. It is obvious that this manner of carrying the locking element on the steering column may be used, instead of the housing 16, and in this way cheapen the construction of the entire locking device, thereby permitting the locking device to be sold for a relatively lower cost than if manufactured and sold with the housing 16.

The invention having been set forth, what is claimed as being useful is:—

1. The combination with a steering column having a steering wheel, of upper and lower jaws engaging over and under one of the spokes of the steering wheel, one jaw being movable on the other, the adjacent ends of said jaws having rectangular openings, means engaging through the openings for connecting the two ends of said jaws, said means having parts adapted to lie at right-angles to the openings for locking the adjacent ends of the jaws together, and means for movably anchoring one of the jaws to the steering column.

2. The combination with a steering column having a steering wheel, of a locking element movably anchored on the steering column and having a jaw overlying one of the spokes of the steering wheel, a second jaw movable on the locking element and engaging under the spoke, and means for detachably locking the adjacent ends of the two jaws together, said locking means comprising cylindrical heads on the ends of the jaws, one engaging in the other, the engaging ends of the heads having rectangular slots, a button engaging said slots and having means at both ends to extend at right-angles to the slots, and means for turning the button to lock the same.

3. The combination with a steering column having a steering wheel, of a locking element movably anchored on the steering column and having a jaw overlying one of the spokes of the steering wheel, a second jaw movable on the locking element and arranged under the spoke, and means for detachably locking the adjacent ends of the two jaws together, said locking element comprising two sections, means for joining the two sections, said second jaw being positioned on the locking element to overlie the joint between the two sections, to render the joint inaccessible.

4. The combination with a steering column having a steering wheel, of upper and lower jaws engaging over and under one of the spokes of the steering wheel, the upper jaw having a shank anchored on the column for a relatively limited sliding movement in a direction parallel with the column, the lower jaw being slidably mounted on the shank of the upper jaw, the adjacent ends of the jaws having registering openings, a device engaging through the openings and having means at its opposite ends adapted to lie at right angles to the openings for locking the adjacent ends of the jaws together, and means operatively connected to the device for operating the same to move the means at the opposite ends of the device in registration with the openings whereby the jaws may be unlocked.

5. In a device for the purpose indicated, a steering column including a steering wheel, upper and lower jaws engaging over and under one of the spokes of the steering wheel, one of said jaws being anchored on the column and being movable in a plane parallel thereto, the other being movably mounted on the lower jaw, the adjacent ends of the jaws having openings, connecting means engaging through the openings for connecting the two ends of said jaws, said connecting means having elements fitting within the adjacent jaws and adapted to lie at right angles to the openings for locking the adjacent ends of the jaws together.

In testimony whereof I hereunto affix my signature.

HIRAM C. MILLER.